US009223562B1

(12) United States Patent
Sobel (10) Patent No.: US 9,223,562 B1
(45) Date of Patent: Dec. 29, 2015

(54) CONTROLLABLE DEPLOYMENT OF SOFTWARE UPDATES

(75) Inventor: William E. Sobel, Stevenson Ranch, CA (US)

(73) Assignee: Symantec Corporation, Mountain View, CA (US)

( * ) Notice: Subject to any disclaimer, the term of this patent is extended or adjusted under 35 U.S.C. 154(b) by 2255 days.

(21) Appl. No.: 11/959,103

(22) Filed: Dec. 18, 2007

Related U.S. Application Data

(63) Continuation of application No. 11/106,194, filed on Apr. 13, 2005, now Pat. No. 7,334,005.

(51) Int. Cl.
*G06F 9/44* (2006.01)
*G06F 9/445* (2006.01)

(52) U.S. Cl.
CPC ........................................ *G06F 8/65* (2013.01)

(58) Field of Classification Search
USPC .......................................................... 717/172
See application file for complete search history.

(56) References Cited

U.S. PATENT DOCUMENTS

| 5,805,551 | A | * | 9/1998 | Oshima | G06F 21/80 360/48 |
| 5,881,038 | A | * | 3/1999 | Oshima | G06F 3/0601 369/47.12 |
| 6,073,123 | A | | 6/2000 | Staley | |
| 6,484,262 | B1 | | 11/2002 | Herzi | |
| 6,490,645 | B1 | * | 12/2002 | Shahaf et al. | 710/244 |
| 6,782,527 | B1 | * | 8/2004 | Kouznetsov et al. | 717/103 |
| 7,013,330 | B1 | * | 3/2006 | Tarbotton et al. | 709/219 |
| 7,181,370 | B2 | | 2/2007 | Furem et al. | |
| 7,181,512 | B1 | | 2/2007 | Lesher et al. | |
| 7,203,864 | B2 | * | 4/2007 | Goin et al. | 714/26 |
| 7,240,107 | B2 | * | 7/2007 | Chase-Salerno et al. | 709/222 |
| 7,334,005 | B2 | * | 2/2008 | Sobel | G06F 8/65 |
| 7,380,177 | B2 | * | 5/2008 | Goin et al. | 714/47 |
| 7,441,041 | B2 | * | 10/2008 | Williams et al. | 709/232 |
| 7,555,551 | B1 | * | 6/2009 | McCorkendale | G06F 8/65 709/225 |
| 7,577,721 | B1 | * | 8/2009 | Chen | 709/219 |

(Continued)

OTHER PUBLICATIONS

"Dish Network Receiver Software Versions", Echostar Knowledge Base [online] Jul. 25, 2002 [Retrieved on Jul. 7, 2005] Retrieved from the Internet: <URL: http://web.archive.org/web/20041016185847/ http://ekb.dbstalk.com/295>. 3 pages.

(Continued)

*Primary Examiner* — Marina Lee
(74) *Attorney, Agent, or Firm* — Fenwick & West LLP (57) ABSTRACT

The risk of inadvertent introduction of software bugs to a large number of users during a software update is minimized by controlling updates using a uniform mechanism of sending updates to seed users. A value-generating module generates a value for a computer, the value falling within a population range of values. A sampling range-generating module generates a sampling range of values as a proper subset of the population range, the probability of the random value falling within the sampling range being predetermined. An eligibility determination module determines whether the computer is eligible to receive a software update, the computer being determined eligible when the random value for the computer falls within the sampling range, and an update module provides the software update to the computer based on the eligibility determination. In some embodiments, a problem review module determines whether the update has caused a problem for computers receiving the update.

20 Claims, 5 Drawing Sheets

(56) References Cited

U.S. PATENT DOCUMENTS

| | | |
|---|---|---|
| 2003/0066065 A1 | 4/2003 | Larkin |
| 2004/0019889 A1 | 1/2004 | Melchione et al. |
| 2004/0031028 A1* | 2/2004 | Hunt et al. .................... 717/170 |
| 2004/0060044 A1 | 3/2004 | Das et al. |
| 2004/0172401 A1* | 9/2004 | Peace ...................... G06F 17/18 |
| 2004/0181787 A1* | 9/2004 | Wickham et al. ............. 717/168 |
| 2004/0187103 A1* | 9/2004 | Wickham et al. ............. 717/168 |
| 2005/0120040 A1 | 6/2005 | Williams et al. |
| 2005/0289401 A1* | 12/2005 | Goin et al. ..................... 714/47 |
| 2006/0075001 A1 | 4/2006 | Canning et al. |
| 2006/0080656 A1* | 4/2006 | Cain et al. ..................... 717/174 |
| 2006/0248116 A1* | 11/2006 | Sobel ........................ 707/104.1 |

OTHER PUBLICATIONS

"Frequently Asked Questions about Updating Your Computer", Microsoft.com [online] Aug. 25, 2004 [Retrieved on Jul. 7, 2005] Retrieved from the Internet: <URL: http://web.archive.org/web/20041009194056/www.microsoft.com/a . . . >. 5 pages.

* cited by examiner

CONTROLLABLE DEPLOYMENT OF SOFTWARE UPDATES

CROSS REFERENCE TO RELATED APPLICATIONS

This application is a continuation of U.S. patent application Ser. No. 11/106,194, filed Apr. 13, 2005, entitled "Controllable Deployment of Software Updates," now U.S. Pat. No. 7,334,005, which is hereby incorporated by reference in its entirety, including any appendices or attachments thereof, for all purposes.

BACKGROUND OF THE INVENTION

1. Field of the Invention

This invention pertains in general to computer software update deployment, and more specifically to techniques for controlled release of software updates to random subsets of seed users over time.

2. Description of the Related Art

Deploying a software update to a large number of users at a time can pose numerous problems since such updates sometimes introduce software bugs or cause other problems when released to the public. Software companies have attempted to deal with this problem by limiting the initial release of a new software update to only a subset of all possible users. If a software update is released to only 10,000 machines in a first round of release rather than to the entire pool of millions of users, it is much easier to deal with any problems or bugs introduced by the software. The users who are affected by the problem are much fewer and more manageable in this type of limited initial release.

There are a number of different ways in which this type of limited software update deployment has been performed. One method involves limiting the initial release only to users in a particular target country or some other defined subset of users. For example, all users in Denmark for a particular software application that is being updated will receive the update first and can report any problems with the software before it is released to the general public. However, this manual release method has caused problems in the past when, for example, a particular bug only manifested itself in the target country and nowhere else. Thus, in those instances, the testing of the product by the seed users in the target country was not representative of the entire population of users of the software application to whom the update would ultimately be deployed.

Another method for limiting update release includes the timed posting and removal of updates. For example, the software update can be made available to the general public at 2 a.m. for a couple of hours, and then the update is removed. The goal of this method is to permit a subset of users to have a chance to download the update during this two-hour window, and those users can report problems with the software update before it is released more generally to the public. The company distributing the software can monitor for bug reports and reports of system crashes to determine whether the update is ready to be provided to a broader group of users. This manual release method, however, is still not very useful because there are no statistics tied into the update release, and there is no way to know who the seed users are or whether the coverage of the seed user base is adequate for testing the software before a much wider release.

None of the above manual methods of release provide a sufficient amount of control over the software update deployment. However, control is particularly important in situations where software updates have to be released on a very short time frame, since the patch may be needed to resolve a current issue that users are facing with the software. If the software update has to be released within a week, there is very little time to run an actual beta test cycle for the update. For example, the posting and removal of software at 2 a.m. may have to be repeated numerous times over a few days to get enough downloads to form a significant enough seed user base. However, for a critical software update for which time is of the essence, there may not be time to develop a representative base and the product may be released to the public before being properly tested.

Therefore, there is a need in the art for a method that allows a more uniform mechanism of systematically sending out software updates to a defined and random proportion of seed users before the mass distribution of the update, allowing software updates to be controlled to a much more granular level.

DISCLOSURE OF INVENTION

The above need is met by controlling software updates using a uniform mechanism of sending updates to seed users. A value-generating module generates a random value for a computer, the value falling within a population range of possible values. A sampling range-generating module generates a sampling range of values as a proper subset of the population range. In one embodiment, the probability of the random value falling within the sampling range is predetermined. An eligibility determination module determines whether the computer is eligible to receive a software update, the computer being determined eligible when the random value for the computer falls within the sampling range, and an update module provides the software update to the computer based on the eligibility determination. In some embodiments, a problem review module determines whether the software update has caused a problem for computers receiving the update. In response to a determination by the problem review module that the software update has not caused substantial problems for the computers receiving the update, the sampling range-generating module broadens the initial sampling range and software updates are provided to computers with random values falling within the adjusted range.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

The update deployment module disclosed herein allows a more uniform mechanism of systematically sending out software updates to a random portion of users before the general distribution of the update to the public, allowing much more control over software updates. Upon success of the distribution of the software to the first group of seed users, the update deployment module can increase the range of the seed users, possibly by an order of magnitude, and the module can continue this increasing of the number of seed users until some predetermined number of users has received the update. As used herein, a "software update," or an "update" or "patch," can include an upgrade to a newer version of a particular software application or module or a version with new functionality, alteration of configuration parameters, a virus definition (or other malicious code definition), addition of an executable module (e.g., a new user feature, an alteration of the operating system or other installed application), and the like.

Figure 1:
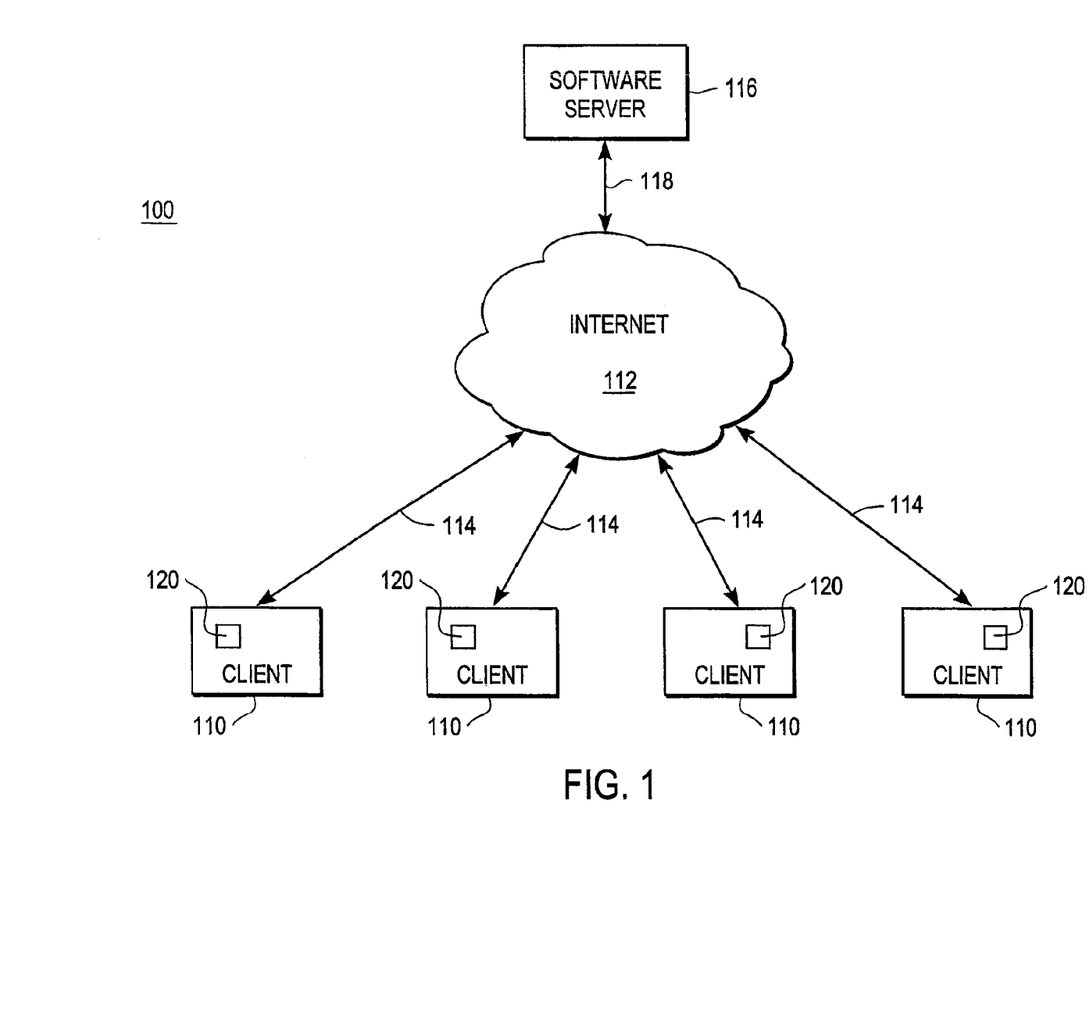
FIG. 1 is a high-level block diagram illustrating an example of a standard computing environment 100, according to one embodiment of the present invention.

FIG. 1 is a high-level block diagram illustrating a computing environment 100 according to an embodiment of the present invention. Multiple client computers 110 are in communication with the Internet 112 or other network, such as a local area network, via communications links 114. Although only four client computers 110 are shown in FIG. 1, there can be thousands or even millions of computer systems coupled to the Internet 112, according to embodiments of the present invention. In one embodiment, the client computers 110 are conventional computer systems. In other embodiments, one or more of the client computers 110 are different electronic devices having connectivity to remote update sources, such as cellular telephones, personal digital assistants (PDAs), etc. A server 116 is also connected to the Internet 112 via a communications link 118.

As is known in the art, the client computers 110 preferably execute an operating system and one or more application programs. As used herein, the term "application" or "software application" can include any type of software or program, a component of a program, a service, an object, a distributed object, or a collection of one or more of these. The operating system controls the operation of the computer system, and some examples of such an operating system include LINUX® or one of the versions of MICROSOFT WINDOWS®.

In FIG. 1, each client computer 110 is connected to the Internet via a communications link 114. Preferably, the communications link 114 utilizes conventional networking technology. For example, in one embodiment a client computer 110 uses a modem to connect over standard telephone lines with an Internet Service Provider (ISP) having a high-speed connection to the Internet 112. In another embodiment, a client computer 110 uses a digital subscriber line (DSL) or cable modem to access the ISP via a telephone line or cable television line, respectively. In yet another embodiment, the client computer 110 uses a network card and Ethernet connection to directly connect to the Internet 112. In still other embodiments, the communications link 114 connects the client computer 110 via a wireless 802.11, Bluetooth, or mobile phone (e.g., CDMA or GSM) network. Thus, many different types of technology can be used to provide the functionality of the communications link 114.

As known in the art, the Internet is a large, publicly-accessible network of networks. Individual computers and other devices can utilize communications protocols such as the transmission control protocol/Internet protocol (TCP/IP) to send messages to other computers on the Internet. These messages can use protocols such as the hypertext transport protocol (HTTP), file transfer protocol (FTP), simple mail transport protocol (SMTP), post office protocol 3 (POP3), and Internet message access protocol (IMAP), and data representations such as the hypertext markup language (HTML) and extensible markup language (XML) to carry and exchange information. Embodiments of the present invention may use other communications protocols and languages to exchange data.

Another communications link 118 connects the server 116 to the Internet 112. The server 116 can send information, such as software updates or patches, across the Internet 112 and to the client computers 110. Additionally, the client computers 110 can send out information (i.e., providing randomly generated values to the server 116 for controlled update deployment) or make requests across the Internet 112 to the server 116, such as general requests for software updates or requests for updates for a particular software application. The communications link 118 is generally the same as the communications links 114 connecting the client computers 110 to the Internet 112. Although only one server 116 and associated communications link 118 are shown in FIG. 1, embodiments of the present invention may have multiple servers and/or links. The server 116 may be a conventional computer system or a network of systems.

In the embodiment illustrated in FIG. 1, each client computer 110 executes an update deployment module 120 for controlling software update deployment for the client computer 110. The update deployment module 120 can be a discrete application program, or the module 120 can be integrated into another application program or the client computer's 110 operating system. In some embodiments, all or a portion of the update deployment module 120 is executed on the server 116. Thus, the server 116 controls which software updates are sent out and which computers will receive the updates. For example, the module 120 might include two different programs, one running on the server 116 and one running on the client 110. The program running on the server 116 can set up parameters for determining which clients 110 will receive an update, and the program running on the clients 110 can generate a value that may or may not fall within the parameters set by the server 116. The server 116 can then send the software update to the clients 110 that fall within the established parameters, which will be a subset of all of the users who will eventually receive the update. Thus, both the client computers 110 and the server 116 can be involved in creating a controlled environment for update release.

Figure 2:
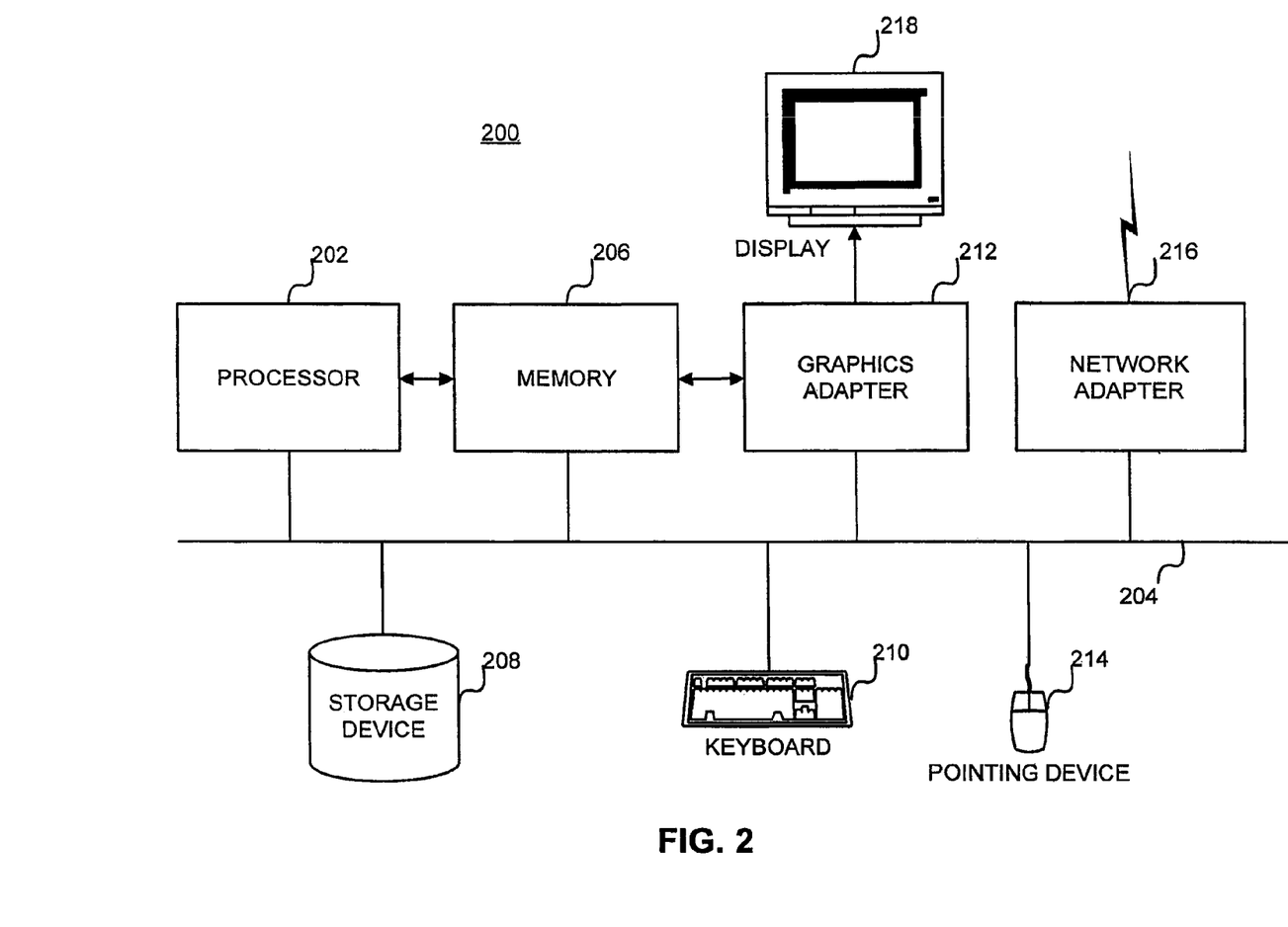
FIG. 2 is a high-level block diagram illustrating a standard computer system 200 for use with the present invention.

FIG. 2 is a high-level block diagram illustrating a functional view of a typical computer system 200 for storing and executing the compatibility module 120, according to one embodiment of the present invention. This computer system 200 can act as a client computer 110, as shown in FIG. 1.

However, one or more of the components of the computer system 200 may be missing or modified in the client computer 110. Illustrated is a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86, SUN MICROSYSTEMS SPARC, or POWERPC compatible-CPU, or the processor 202 may also be a custom-built processor. The memory 206 may be, for example, firmware, read-only memory (ROM), non-volatile random access memory (NVRAM), and/or RAM, and holds instructions and data used by the processor 202. The storage device 208 is, in one embodiment, a hard disk drive but can also be any other device capable of storing data, such as a writeable compact disk (CD) or DVD, and/or a solid-state memory device. The pointing device 214 may be a mouse, track ball, or other type of pointing device, and is used in combination with the keyboard 210 to input data into the computer system 200. The graphics adapter 212 displays images and other information on the display 218. The network adapter 216 couples the client computer 110 with the Internet 112.

As is known in the art, the computer system 200 is adapted to execute computer program modules for providing functionality described herein. In this description, the term "module" refers to computer program logic for providing the specified functionality. A module can be implemented in hardware, firmware, and/or software. Where the any of the modules described herein are implemented as software, the module can be implemented as a standalone program, but can also be implemented in other ways, for example as part of a larger program, as a plurality of separate programs, or as one or more statically or dynamically linked libraries. It will be understood that the modules described herein represent one embodiment of the present invention. Certain embodiments may include other modules. In addition, the embodiments may lack modules described herein and/or distribute the described functionality among the modules in a different manner. Additionally, the functionalities attributed to more than one module can be incorporated into a single module. In one embodiment of the present invention, the modules are stored on the storage device 208, loaded into the memory 206, and executed by the processor 202. Alternatively, hardware or software modules may be stored elsewhere within the computer system 200.

Figure 3:
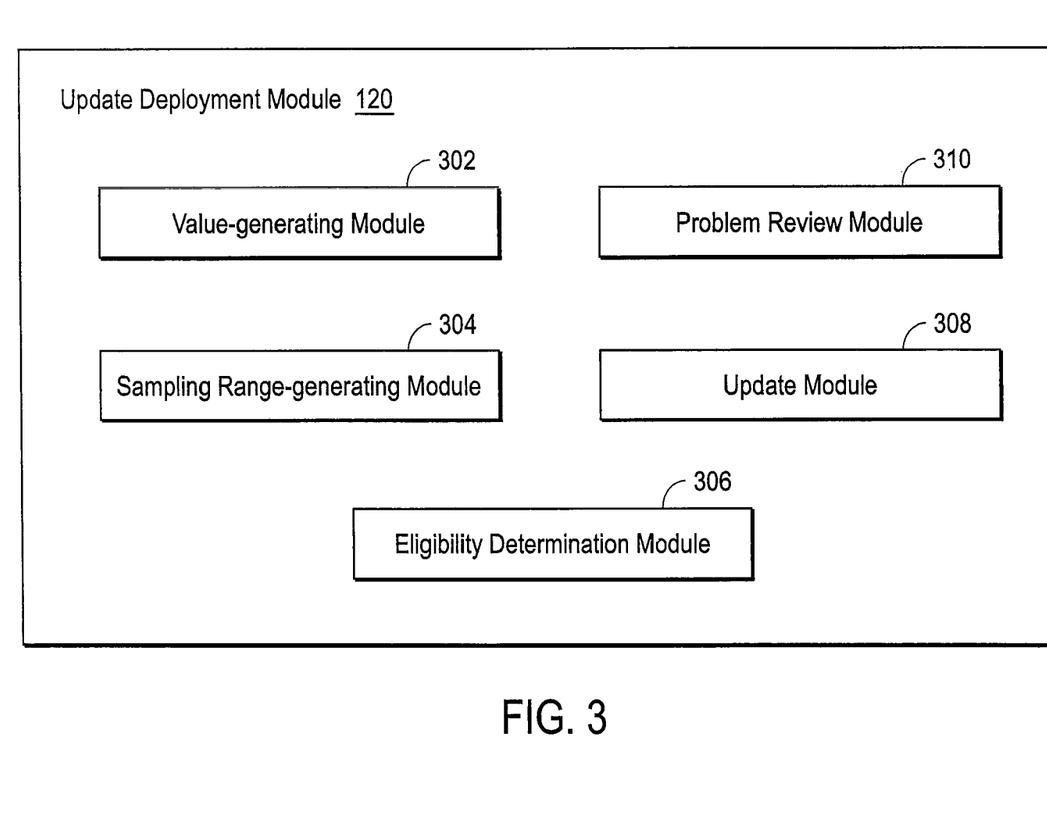
FIG. 3 is a high-level block diagram illustrating the functional modules within the update deployment module 120, according to one embodiment of the present invention.

FIG. 3 is a high-level block diagram illustrating the functional modules within the update deployment module 120, according to one embodiment of the present invention. The update deployment module 120, in the embodiment illustrated in FIG. 3, includes a value-generating module 302, a sampling range-generating module 304, an eligibility determination module 306, an update module 308, and a problem review module 310. Any or all of these modules can be included on a client computer 110, on a server 116, or both.

The value-generating module 302 generates a value that can be a random value for a client computer 110, the value falling within a population range of possible values. One of ordinary skill in the art will recognize that the generation of a "random value" or "random number" can be influenced by a deterministic or known component. For example, the random value generated could be affected by a user's preference settings for risk tolerance or some other type of bias toward generating one number over another, and yet the number generated is still random. In some embodiments, the random value is automatically generated at the time of installation of the value-generating module 302 on a client computer 110. In other embodiments, the value is generated when a server 116 requests this data from a client computer 110. The value can also be generated any time in between the installation and the request. Furthermore, the value can be generated when a client computer 110 first requests a software update from the server 116 or notifies the server 116 that an update is needed.

The random value generated will typically be maintained for the client computer 110, and thus the value continues to exist and is used for a number of different software updates. However, the value-generating module 302 generates a new number for a computer 110 when necessary or desired. For example, a new number can be generated during a user migration to a new machine, after reinstallation of the software, after system failure, or as a debugging mechanism. In some embodiments, the value can change each time a successful update occurs for security reasons.

The random values are preferably non-unique values, and the update deployment process functions most effectively when the values generated are non-unique random values. The values can be non-unique since the invention does not require that every computer 110 or user be tracked (i.e., it is not necessary to track every unknown), as might be necessary in a system that uses unique ID numbers to prevent piracy by tracking each piece of software that is sent out or by keeping track of every subscriber for the software and limiting who can receive updates based on subscriptions.

Typically, the value-generating module 302 generates the random value from a uniform distribution, thus ensuring that a straight uniform sampling of client computers 110 receives the update regardless of the country they live in, the language, the location, the time of day, etc. In this manner, a random subset of all users of the client computers 110 is tested. However, the value can also be generated from other distributions, such as a bell curve distribution, a Poisson distribution, an empirically-defined distribution, and the like.

A multidimensional number could also be generated. Instead of having a single number, a computer 110 can generate a few numbers. For example, the computer 110 can have a number based on the country in which it is located, a number based on the risk tolerance of the user (i.e., certain users may have a high risk tolerance and may be more interested in receiving the most current software updates without delay, and certain users may have an especially low risk tolerance and may only wish to receive the update after it has been well tested by other users), and a number based on some other identifying characteristic. A particular update can thus be set to be tested by users in a 1 to 10 range for risk tolerance, a 1 to 3 range for country, and a 1 to 50 range for some other characteristic, thereby testing different percentages of the users with different defined characteristics.

As stated above, the random value generated falls within a population range of possible values. This population range can be any range from N to N, where N can be for example a 32-bit number, N can be −1, 0, 1, 1000, 1 million, etc., or N can be any machine-representable number, bounded or unbounded. The population range spans the set of values for all users to whom the update will probably ultimately be sent after the testing has been completed. The random values generated by computers 110 to receive the update will fall within the population range.

The sampling range-generating module 304 generates a sampling range of values as a proper subset of the population range, the probability of the value falling within the sampling range being predetermined. The sampling range defines the subset of users who will test the product by defining a range in which the values generated by some of the clients 110 will fall. As described above, the random values generated by the clients 110 will fall within the population range, and the population range spans the set of values for all users to whom the update will probably ultimately be sent after the testing has been completed. Thus, the sampling range generated by the sampling range-generating module 304 is a subset of the population range, and the sampling range defines the subset of values that will be involved in the testing (i.e., the clients 110 with values falling within the sampling range that will test the software update). For example, if the population range is 1 to 1 million, and the update is to be sent out to all users, the sampling range would also be set to be 1 to 1 million. If the population range is 1 to 100 and the sampling range is 1 to 5, clients 110 with values falling within that sampling range (e.g., a value of 4) will receive the software update.

The sampling range can also be discontinuous. For example, the range can run from 1 to 10 and from 21 to 100. This might be useful in a situation where certain users have especially low risk tolerances and do not wish to participate in the testing procedure. Users generating numbers falling within 11 to 20 can be set to receive the update last, after it has been tested by many other users.

The sampling range can be specified in a file that is associated with the software update package to be deployed (e.g., bundled with the software update package or linked with an URL, reference, or pointer to the package). The sampling range can also stored on the client computer 110 or on a server 116 (e.g., in a central location such as a relational database, a registry, or a repository directory).

The sampling range-generating module 304 not only generates the initial range of seed users, but also can generate successively broader sampling ranges (within the population range) as the update testing progresses. For example, if the population range is from 1 to 1000, the sampling range-generating module 304 can initially generate a range of from 1 to 10. This range can be set with the goal of controlling the initial deployment of the update so that 1% of the population of users with random values within the population range will receive the update in the first round. Once deployment has occurred for a period of time and significant problems have not been reported, the module 304 can generate a second broader range to encompass a larger number of target users. For example, the second range might be from 1 to 100, thus rolling out the update to 10% of the users to whom the patch applies in this second round of release. This broadening of the range can continue until the update has been provided to all users to whom the patch applies. Thus, all or most computers 110 with random values within the population range of 1 to 1000 will receive the update. If there are problems at any point during the roll out of the update, the roll out can be stopped while the problem is being resolved. However, any problems encountered should only affect the initial sets of seed users rather than the entire population of users, thus permitting much easier control of damage caused due to problems with the update.

In some embodiments, the starting sampling range will vary as different software updates are released. For example, if the initial sampling range is 1 to 10 for one software update, the initial sampling range can be set to be 11 to 20 for the next software update. In this manner, the first set of seed users who are most likely to be affected by problems with the updates will vary from one update release to another.

In some embodiments, the value-generating module 302 can also generate random values according to an unknown or unexpected distribution. For example, computers and software have been known in the past to have biases, sometimes unexpected, in their random number generators. These biases can result in the generation of random values that are either not truly random or that do not conform to the anticipated distribution, e.g., a uniform, normal, or other distribution. In some embodiments, the sampling generator can set the window according to any known distribution such that the probability of any given value generated will have the desired probability of falling within the window. Additionally, the range can be set based on an empirically-determined frequency of values generated, for example by estimating the empirical distribution for the numbers tested over a window in time such that it will more accurately reflect the true distribution of the sample values that are received. The sampling range-generating module 304 can adjust the size of window based on known patterns or rates of requests for updates. After setting a range, the sampling range-generating module 304 can collect information regarding how many people actually test the update (e.g., it can keep track of the number of downloads), and so the module 304 can build statistical data as it is in operation to determine if oversampling or undersampling is occurring. Therefore, it does not necessarily matter what values are generated or according to what distribution since the sampling range generator can adjust for this.

The eligibility determination module 306 determines whether the computer 110 is eligible to receive a software update. The computer 110 is determined to be eligible when the random value for the computer 110 falls within the sampling range. Thus, the eligibility determination module 306 determines whether or not the value for each computer 110 falls within the sampling range. In some embodiments, the module 306 first determines whether there is a sampling range set for a particular update, and if so, what the range is. The eligibility determination module 306 can make its determination each time software updates are available by asking each client computer 110 for its random value, and then checking to see if the value falls within the sampling range. In some embodiments, the eligibility determination module 306 responds to requests by a client computer 110 for an update, and the module 306 asks the computer 100 for its generated value or the computer 110 automatically provides the value when seeking an update.

In some embodiments, the eligibility determination module 306 runs on a server 116 and, thus the server 116 can determine whether or not a client computer 110 should receive an update. Alternatively, the module 306 can run on the client computers 110, and each client 110 can determine if it is eligible for receiving a patch (and can refuse the patch if it is not eligible).

The update module 308 provides the software update to the computer 110 based on the eligibility determination. In some embodiments, after receiving notification from the eligibility determination module 306 that a computer 110 is eligible to receive an update, the update module 308 will make the update available to the computer 110 so the update can be downloaded by the user. In other embodiments, the update module 308 automatically downloads and installs those changes on the computer 110 if the user has configured the computer 110 to allow these automatic installations.

In some embodiments, the eligibility determination module 306 only finds the computer 110 eligible to receive certain parts of the update. The user may only be permitted to download a particular portion of the update package (i.e., if it is determined that the user is running other software that may conflict with a portion of the update). In the case of automatic updates, the eligibility module can notify the update module 308 of which parts of the update a computer 110 should receive, and the update module 308 automatically downloads and installs those changes.

In some embodiments, the update deployment module 120 also includes a problem review module 310 that determines whether the software update has caused a problem for computers 110 receiving the update. The problem review module 310 can keep track of bug reports or reports of system crashes and determine if these problems are due to the software update being released. If the problem review module 310 detects that there is a problem with the update, the problem review module 310 can temporarily end the update release process while the problem is being remedied. If the problem review module 310 detects no problems, the module 310 can allow the release to continue. In some embodiments, the problem review module 310 runs on a client computer 110 and reports problems to the server 116. The server 116 can use this feedback to adjust update delivery accordingly.

Figure 4:
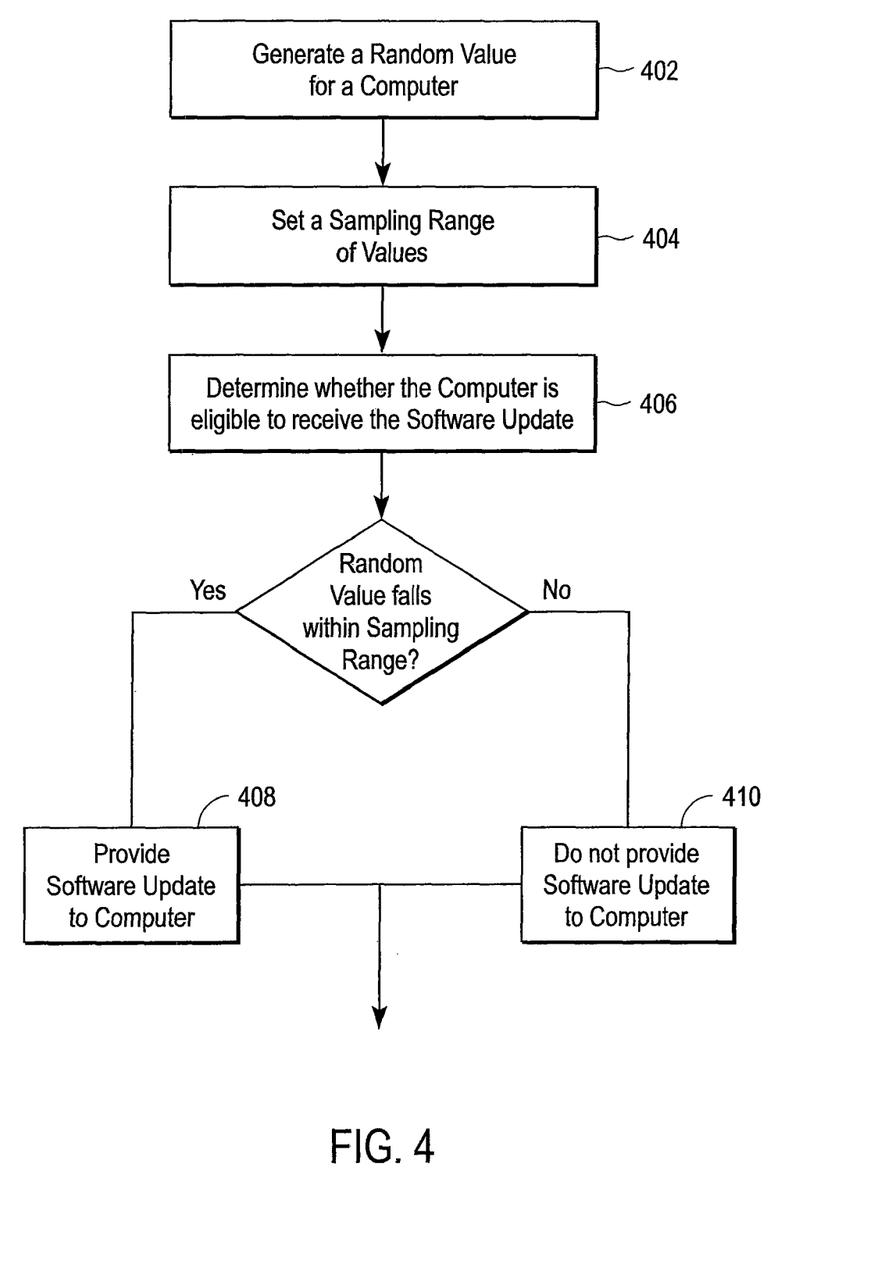
FIG. 4 is a flowchart illustrating steps performed to control the release of software updates, according to one embodiment of the present invention.

Referring now to FIG. 4, there is shown a flowchart illustrating the operation of the update deployment module 120, according to some embodiments of the present invention. It should be understood that these steps are illustrative only. Different embodiments of the update deployment module 120 may perform the illustrated steps in different orders, omit certain steps, and/or perform additional steps not shown in FIG. 4.

As shown in FIG. 4, the update deployment module 120 generates 402 a random value for a computer. Each client computer 110 connected to a server 116 can generate a value, for example. This value generated will fall within a population range, and as described previously, the population range spans the set of values for all clients 110 to whom the update will probably ultimately be sent after the testing has been completed. For example, the population range could be 1 to 1000 (or could be much larger, such as 1 to 1 million). The random value generated is preferably non-unique (e.g., more than one client 110 can generate the same value), and the value will fall within the population range of 1 to 1000. Client A might generate a random value of 5, while client B might generate a random value of 20. These values for clients A and B can be maintained through numerous software updates, and can potentially be maintained until generation of a new number becomes necessary (e.g., system failure or user migration to a new machine).

The update deployment module 120 sets 404 a second range as a subset of the population range described above, and this second range is referred to as the sampling range of values. The sampling range can be chosen according to the proportion of seed users to receive the initial update. The range is also a proper subset of the population range, and the probability of the random value falling within the sampling range can be predetermined. For example, where the population range is 1 to 100, the sampling range might be 1 to 10, and clients 110 that have generated random values falling within the sampling range (e.g., a value of 3) will receive the update.

In some embodiments, a file describing the content of an update package stores the sampling range as a minimum and a maximum range value, and the value generated by a client 110 will have to fall within this range for that client 110 to install the update. For example, the initial testing range of a software update can include a minimum of 1 and a maximum of 10. By selecting this sampling range within the population range, it is possible to control the deployment of this update so that it will be provided to up to 1% of the user base for that software application. This can be a straight, uniform distribution of 1%, regardless of the language, location, or time of day for the release, and this sample will be somewhat representative of the overall population. Thus, a manageable sample of seed users receive the initial release of the software before the software update is released more generally.

The update deployment module 120 determines 406 whether a computer is eligible to receive the software update. The module 120 determines whether or not the value generated by the computer falls within the sampling range. When an update is going to be released, the server 116 can request from each client 110 its value that was generated, or the clients regularly scan for updates and can offer their numbers to the server 116. In some embodiments, the server 116 sends out the updates to all of the clients 110, and the clients 110 determine whether or not their value generated falls within the sampling range, and thus whether or not to accept or refuse the update.

Returning to the previous example, the value of 5 generated by client A falls within the sampling range of 1 to 10, while the value of 20 for client B does not. Module 120 determines 406 that client A is eligible to receive the first release of the software update, while client B is not be eligible. The module 120 thus provides 408 the software update to client A, but does not provide 410 the update to client B. The module 120 can make the update available to the clients 110 eligible to receive the update so the client can then download the update, or the module 120 can even automatically install the update on the client computer 110.

Figure 5:
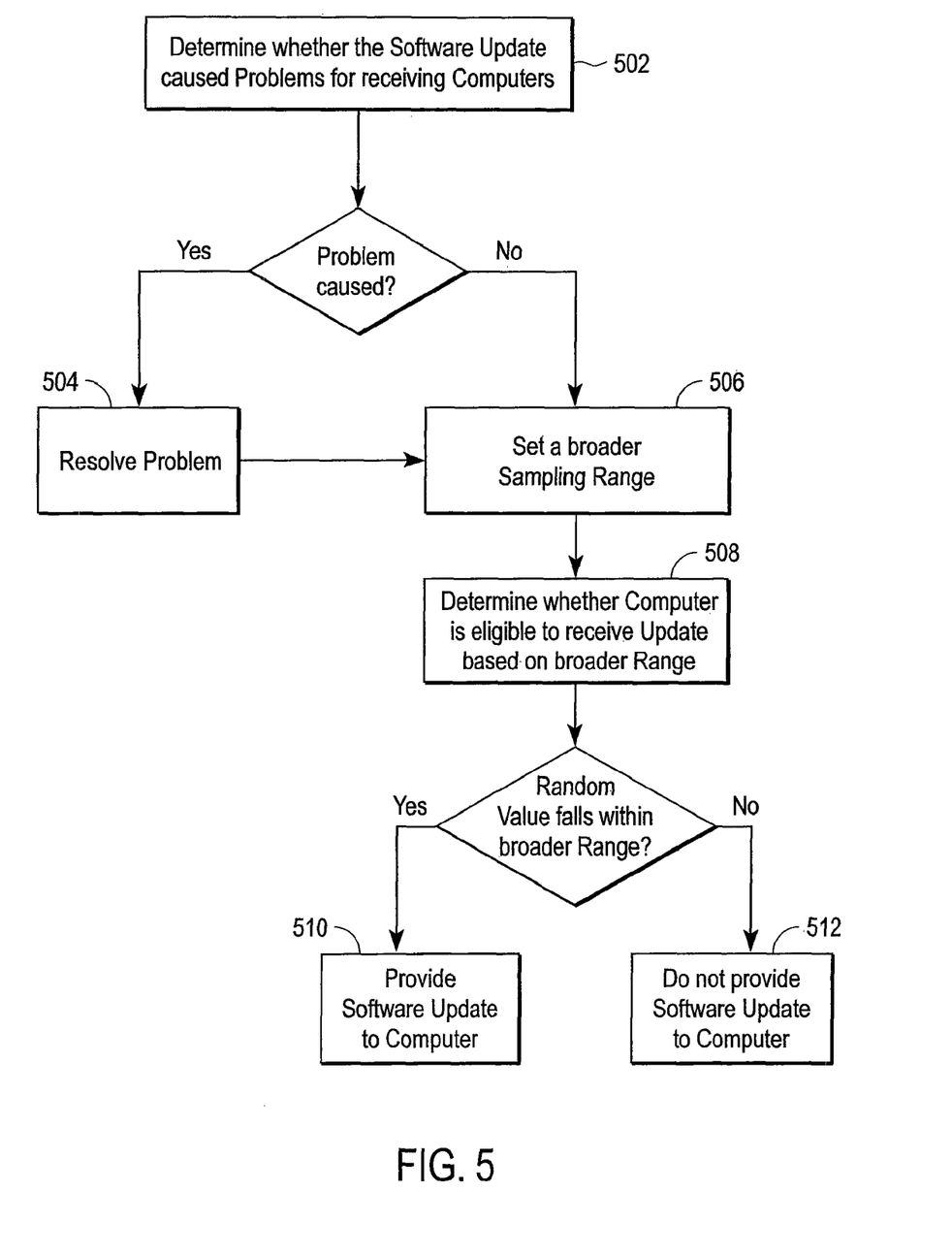
FIG. 5 is a flowchart illustrating steps performed to control the release of software updates where the sampling range is being broadened over time, according to one embodiment of the present invention.

Referring now to FIG. 5, there is shown a continuation of the previous flowchart, according to some embodiments of the present invention. Once the update has been received by the eligible client computers 110, the update deployment module 120 can determine 502 whether the update caused problems for the computers 110 receiving the updates. The module 120 can do this by monitoring for bug reports, by reviewing for crash reports (e.g., using Microsoft® Online Crash Analyzer to determine if crashes are occurring due to the software update), or other similar methods. If a problem occurs, the problem can first be resolved 504 before the software update release process is continued. For example, if it is discovered that the update includes a software bug, the update can be modified by the software company that created the update to remove the bug or otherwise repair the problem. If after a period of time (e.g., a few hours, a few days, a few weeks, etc.) there have not been any problems or not been significant problems, the update deployment module 120 can set 506 a broader sampling range (i.e., broaden the previously set sampling range). The module 120 can do this by updating a file that is associated with the update package and that stores the sampling range. The sampling range can also be stored in some other central location (e.g., a database), and be updated there. Returning to the previous example, the module 120 can adjust the sampling range of 1 to 10 and increase it to 1 to 100. Under this adjusted range, the update can be deployed to a larger user base (i.e., can be rolled out to up to 10% of the users).

The update deployment module 120 can again determine 508 whether each computer is eligible to receive the update based on the broader sampling range. The value of 20 for client B will fall under the broader sampling range of 1 to 100. Thus, the module 120 can provide 510 the update to client B during the second release to seed users, but the module 120 will not provide 512 the update to another client 110 with a value equal to 200, for example. This process can be repeated numerous times, with the sampling range being broadened each time until all (or most) of the users within the population range of 1 to 1000 have received the update (i.e., when the sampling range is broadened to 1 to 1000, all of the users in the population range of 1 to 1000 will receive the update). Alternatively, at some point after enough users have tested the update, the range restriction can be removed to effectively deploy the update to all users. The process can be stopped at any point in which problems are encountered along the way so that the problems can be resolved before they have a chance to affect the entire user base.

In deployment of a second software update, clients A and B can maintain their values of 5 and 20. The sampling range can be generated so that the same starting range of 1 to 10 is not chosen each time, but instead the system is set to generate different range (e.g., 11 to 20). In this manner, the same set of initial seed users is not always put at the greatest risk by being the first users to test a new update.

The software update deployment method including the broadening of the sampling range to encompass more users over time can be done manually or can also be done automatically. In the automatic deployment, the update deployment module 120 can receive details about the desired deployment of a software update, e.g., the "ramp" for deployment over time. The module 120 can be provided with information including what the update is, how long the release should take, what the "ramp up" of the release should look like (i.e., how steep should the ramp be or how quickly should the update be released to more and more users), and the like. The module 120 will automatically generate the numbers to match these parameters. The module can then start each release and automatically generate larger sampling ranges according to the set parameters to automatically release the update to more and more users over time until all users have received the update. For example, the module 120 can automatically make changes over time so that there is an increase in the sampling range by 1% per day over the first week to cover up to 7% of the users and an increase by 2% per day in the second week and then 8% per day after that.

This process can continue automatically until the process is stopped (i.e., if a problem with the software is discovered). Once the problem is resolved, the automatic process can be reinitiated. The parameters can be adjusted to meet the needs for each update. More critical updates, for example, may require very quick release and thus a steep ramp, as opposed to less critical updates that can be released slowly over a longer period of time. As discussed previously, the sampling range can be stored in a file that can be modified as the sampling range is broadened over time. In this manner, an automated, controlled, global deployment of the software update can occur.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

I claim:

1. A computer program product comprising a non-transitory computer-readable medium having computer program logic embodied therein for controllably providing software updates from an update server to a random sample of computers with updateable software, the computer program logic comprising:
   a sampling range-generating module for generating at the update server a sampling range of values as a proper subset of a population range of possible values;
   a receiving module for receiving at the update server from a computer a generated random value, the random value falling within the population range;
   an eligibility determination module for determining at the update server whether the computer is eligible to receive a software update, the computer being determined eligible responsive to whether the received random value falls within the sampling range; and
   an update module for providing the software update from the update server to the computer based on the eligibility determination.

2. The computer program product of claim 1, wherein the random value received from the computer is a multi-dimensional number that allows provision of software updates to the computer to be controlled according to multiple variables.

3. The computer program product of claim 2, wherein the multi-dimensional number includes a number based on a country in which the computer is located and controls provision of software updates to the computer according to the country.

4. The computer program product of claim 2, wherein the multi-dimensional number includes a number based on a risk tolerance of a user of the computer and controls provision of software updates to the computer according to the risk tolerance.

5. The computer program product of claim 1, further comprising:
   a problem review module for determining whether the software update has caused a problem for the computer receiving the update; and
   the sampling range-generating module generating a broader sampling range to include more random values within the sampling range in response to a determination by the problem review module that the software update has not caused substantial problems for the computer receiving the update, wherein the sampling range of values is stored in a file that is updated over time as the sampling range-generating module generates broader sampling ranges.

6. The computer program product of claim 1, wherein the random value received from the computer is maintained for the computer for more than one software update.

7. The computer program product of claim 1, wherein the sampling range-generating module automatically generates broader sampling ranges over time according to set parameters to provide updates to an increasing number of computers.

8. A method of controllably providing software updates from an update server to a random sample of computers with updateable software, the method comprising:
   generating at the update server a sampling range of values as a proper subset of a population range of possible values;

receiving at the update server from a computer a generated random value, the random value falling within the population range;

determining at the update server whether the computer is eligible to receive a software update, the computer being determined eligible responsive to whether the received random value falls within the sampling range; and providing the software update from the update server to the computer based on the eligibility determination.

9. The method of claim 8, wherein the random value received from the computer is a multi-dimensional number that allows provision of software updates to the computer to be controlled according to multiple variables.

10. The method of claim 8, further comprising:

determining whether the software update has caused a problem for the computer receiving the update; and generating a broader sampling range to include more random values within the sampling range in response to a determination that the software update has not caused substantial problems for the computer receiving the update, wherein the sampling range of values is stored in a file that is updated over time over time as broader sampling ranges are generated.

11. The method of claim 8, automatically generating a broader sampling range over time according to set parameters to provide updates to an increasing number of computers.

12. The method of claim 8, further comprising generating a different sampling range of values for a second software update.

13. The method of claim 8, wherein the multi-dimensional number includes a number based on a country in which the computer is located and controls provision of software updates to the computer according to the country.

14. The method of claim 8, wherein the multi-dimensional number includes a number based on a risk tolerance of a user of the computer and controls provision of software updates to the computer according to the risk tolerance.

15. A system for controllably providing software updates from an update server to a random sample of computers with updateable software, the system comprising:

a processor for executing computer program logic; and a non-transitory computer-readable medium having executable computer program logic embodied therein comprising:

a sampling range-generating module for generating at the update server a sampling range of values as a proper subset of a population range of possible values;

a receiving module for receiving at the update server from a computer a generated random value, the random value falling within the population range;

an eligibility determination module for determining at the server whether the computer is eligible to receive a software update, the computer being determined eligible responsive to whether the received random value falls within the sampling range; and an update module for providing the software update from the update server to the computer based on the eligibility determination.

16. The system of claim 15, wherein the random value received from the computer is a multi-dimensional number that allows provision of software updates to the computer to be controlled according to multiple variables, the multi-dimensional number comprising a plurality of numbers.

17. The system of claim 15, further comprising:

a problem determination module for determining whether the software update has caused a problem for computers receiving the update; and the sampling range-generating module generating a broader sampling range to include more random values within the sampling range in response to a determination by the problem review module that the software update has not caused substantial problems for the computers receiving the update.

18. The system of claim 17, wherein the sampling range of values is stored in a file that is updated over time as the sampling range-generating module generates broader sampling ranges.

19. The system of claim 15, wherein the sampling range-generating module automatically generates broader sampling ranges over time according to set parameters to provide updates to an increasing number of computers.

20. The system of claim 15, wherein the multi-dimensional number includes a number based on a country in which the computer is located that controls provision of software updates to the computer according to the country and a number based on a risk tolerance of a user of the computer that controls provision of software updates to the computer according to the risk tolerance.

* * * * *